Jan. 4, 1955    M. BERNSTEIN    2,698,754
COLLET CLOSER
Filed Oct. 30, 1953
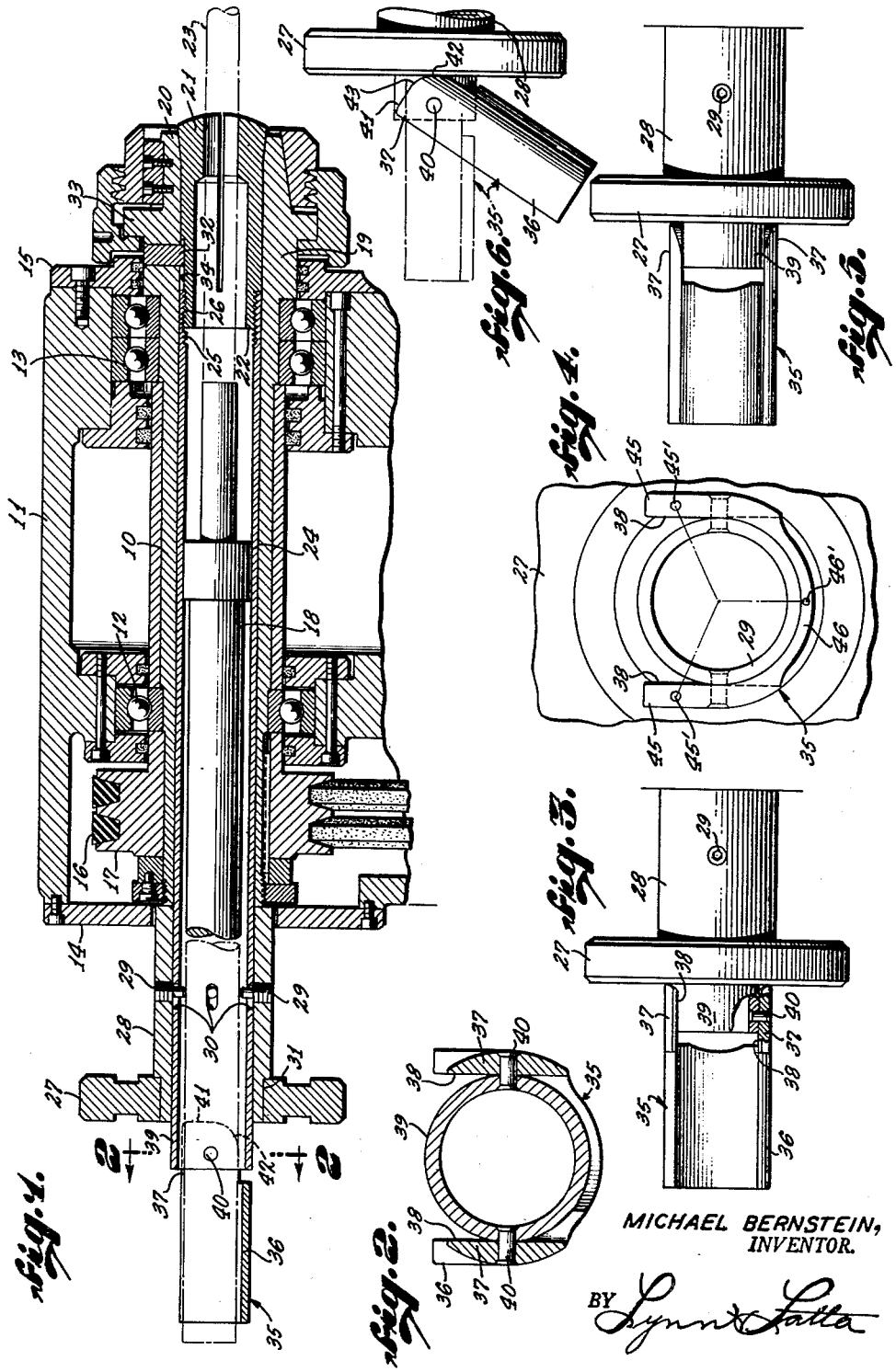
MICHAEL BERNSTEIN,
INVENTOR.
BY Lynn Latta
ATTORNEY.

United States Patent Office 2,698,754
Patented Jan. 4, 1955

2,698,754

COLLET CLOSER

Michael Bernstein, Los Angeles, Calif.

Application October 30, 1953, Serial No. 389,260

12 Claims. (Cl. 279—51)

This invention relates to collet closers for machine tools such as engine lathes, milling machines, drill presses, and any other machine tool apparatus having work or tool chucking means utilizing a collet. The general object of the invention is to provide an improved collet closer actuator which is generally of the hand wheel type, but is speedier in operation than the conventional actuator.

A particular object of the invention is to provide a collet closer of this general type, having means for locking the collet tightly to the work without requiring the exertion of considerable force against the hand wheel, as is required in the conventional collet closer. More particularly, the invention contemplates a collet closing apparatus including, in addition to a hand wheel actuator for rough adjustment of the collet to the work diameter, a tightening device adapted to establish a high tension load on the collet actuator tube so as to clamp the collet jaws securely against the work.

A further object is to provide a collet closing mechanism including a collet tightening means which eliminates the necessity for locking the spindle of the machine during the tightening of the collet. A further object is to provide such a tightening device which is not subject to being released under the influence of vibration such as may exist in the lathe or other machine.

A further object is to provide such a combination of hand wheel adjusting means and collet tightening means which may be actuated quickly and easily.

A further object is to provide a collet closer utilizing a cam and lever jaw tightener and having a dynamically balanced condition existing in the lever in the tightened position.

Other objects will become apparent in the ensuing specifications and appended drawings in which:

Fig. 1 is an axial sectional view of a portion of an engine lathe with the collet closing mechanism of my invention embodied therein and shown in collet-tightening position;

Fig. 2 is a transverse sectional view taken on the line 2—2 of Fig. 1;

Fig. 3 is a plan view of the collet closing actuator assembly with portions broken away and shown in section;

Fig. 4 is an end view of the same;

Fig. 5 is an inverted plan view of the same; and

Fig. 6 is a side view of the tightener, in collet-relaxing position.

As an example of one form of mechanism in which my invention may be embodied, I have shown in the drawings a portion of an engine lathe wherein a lathe spindle 10 is mounted for rotation in a head stock 11 through the medium of anti-friction bearings 12, 13, the headstock 11 being generally in the form of a casing having end caps 14, 15, and the spindle 10 being driven by a belt drive including belts 16 and a belt pulley 17 which is attached to the spindle near its rear end. Caps 14, 15 have central apertures, through which the spindle and closer parts project. A work stop 18 is adapted to be received within spindle 10.

The forward end of the spindle 10 has a head 19, projecting through cap 15. Head 19 is provided with a collet socket which may either be an internal wall formed as an integral part of the spindle, or may be in the form of a separate insert sleeve in accordance with common practice. Since it is immaterial to the present invention whether the collet socket is a separate part, it has not been so illustrated. The socket has at its forward end the conventional collet throat 20 having a frustro-conical inner wall against which mating external faces of the jaws 21 of a conventional tubular collet 22 are slidably engaged for wedging action such that, by drawing the collet inwardly with reference to throat 20, the jaws may be contracted against the work (e. g. a rod, indicated in phantom at 23) passing through the collet.

For shifting collet 22 axially within the spindle 10, there is provided the conventional collet closing tube 24 which is slidably and rotatably mounted in spindle 10 and, at its forward end, has an internal thread 25 in threaded engagement with an external thread 26 on the rear end of collet 22.

A conventional collet closing movement, for rough adjustment, is imparted to collet sleeve 22 by rotating tube 24 while holding it against axial backing-off movement and while restraining the collet 22 against rotation within spindle 10, rotation is imparted to tube 24 through a hand wheel 27 which has a hub 28 mounted upon a rear end portion of tube 24 which projects rearwardly through rear end plate 14 of the spindle head. Hub 28 is keyed to tube 24 by suitable keys such as the set screws 29 the inner ends of which pass through slots 30 in tube 24. In the specific form shown, hub 28 is a separate part having a reduced neck 31 on which wheel 27 is secured, as by a pressure fit. To restrain the tube 24 against axial movements, hub 28 has end bearing engagement against the rear end of the spindle 10. Such engagement will restrain the tube 24 against moving toward the collet 22, to provide a fulcrum from which tension loads, for tightening the collet, can be set up in tube 24.

To restrain collet 22 against rotation, a key 32 is mounted in the enlarged head 33 of spindle 10, and is engaged in a keyway 34 extending longitudinally in collet 22, whereby the collet is free to slide axially in response to the action of tube 24, but is restrained against rotation in spindle 10.

It will now be apparent that by rotating hand wheel 27 in one direction, while collet 22 is restrained against rotation, the collet will be drawn into tube 24 as the result of the coaction of threads 25, 26, causing the jaws 21 to have a wedging action in throat 20 and to be clamped inwardly against the work 23, whereas by rotating hand wheel 27 in the opposite direction, the collet will be retracted with relation to the tube 24, with the result that the jaws 21 may open and release the work.

The present invention provides, in combination with the hand wheel actuated mechanism above described, a collet tightener which is actuated after the collet jaws have been adjusted to the work by operation of hand wheel 27. Such tightener involves an axially shiftable connection between hand wheel hub 28 and tube 24. Axial shifting movements between the two is accommodated by the elongation of slots 30 in which the driving engagement between keys 29 and tube 24 is established. The axial shifting movement is effected by a lever, indicated generally at 35, said lever having alternative positions in which it establishes different positions of relative axial shift between tube 24 and hand wheel 27.

Lever 35 includes a handle portion 36 which is of channel section, of dimensions such that there is provided within handle 36, space of amply large proportions to receive the work stop 18 (Fig. 1). At its forward end, lever 35 is bifurcated to provide a pair of cam fingers 37 which have flat inner faces 38 spaced so as to snugly embrace between them the diameter of tube 24. Tube 24 has a rear end portion 39 projecting beyond hand wheel 27 to an extent somewhat less than the length of fingers 37, and lever 35 is pivotally connected to the projecting tube portion 39 by means of pivots 40 (e. g. rivets). Fingers 37 engage with a camming action against the forward face of hand wheel 27 which, in the particular form of the invention shown, constitutes the rear end of reduced neck portion 31 of hub 28.

With such a construction, the hand wheel may be of a relatively soft material (e. g. aluminum) and adequate hardness in the bearing surface of the hand wheel, to resist wear from repeated movements of cam fingers 37 thereagainst, may be obtained by utilizing a harder material, such as bronze or steel, in hub 28. Alternatively, a bearing washer could be interposed between fingers 37 and the hand wheel, in which case it would not be necessary to have the rear end of hub 28 exposed.

The flat inner faces 38 of fingers 37 accommodate swinging movement of lever 35 between limit positions one of which (collet tightening position) is indicated in Fig. 1, the other of which (collet relaxing position) being indicated in Fig. 6. In the collet tightening position, squared ends 41 of cam fingers 37 are engaged against the hand wheel. When the lever 35 is in the collet relaxing position shown in Fig. 6, the relative positions of the hand wheel and the tube 24 are determined by engagement of diagonal faces 42 of cam fingers 37 against the rear face of the hand wheel. Diagonal faces 42 are arranged somewhat closer to the axis of pivots 40 than are the squared end faces 41, and thus, in this position, the tube 24 is allowed to assume a position advanced slightly forwardly in spindle 10, with reference to its position dictated by the engagement of end faces 41 against the hand wheel.

In moving the lever 35 from its position of Fig. 6 to its position of Fig. 1, the cam fingers 37 exert a camming action against the hand wheel which draws the tube and collet rearwardly so as to tighten the collet upon the work 23. This camming action is effected by curved cam faces 43 which join the diagonal faces 42 to the end faces 41 of the cam fingers 37. The faces 43 are of spiral form, so as to provide, with reference to the axis of pivots 40, a gradual "rise" between the closer diagonal faces 42 and the more distantly spaced end faces 41. A high leverage is obtained in the movement of the lever 35 from the relaxed position to the tightening position, and it thus becomes possible to clamp the collet jaws against the work with adequate grip to efficiently drive the work during any machining operation thereon.

As the lever is shifted in the other direction from its tightening position of Fig. 1 to the relaxed position of Fig. 6, shaft 24 is allowed to shift forwardly to a slight extent, so as to allow the collet jaws to loosen their grip upon the work.

Fig. 6 illustrates, in exaggerated proportion, the shift of the pivots 40 between the full line positions of maximum closeness to the handwheel 27 (which permits the forward shift of shaft 24 to the relaxed positon) and the dotted line position which is established by movement of lever 35 to its position of Fig. 1, this dotted line position indicating the rearward pull of the tube 24 to its tightening position. Actually, the amount of shift is much less than that indicated in Fig. 6, being just sufficient to effect a secure tightening of the jaws against the work in the one position and a relaxing of the grip on the work in the other position.

For any particular piece of work (i. e. a rod section of a particular diameter) the actuation of lever 35 may be sufficient to loosen the work so that it may be removed, and to again tighten the collet upon a new work piece. The operation of hand wheel 27 may be resorted to for further opening or closing jaws 21 to accommodate a range of variations in diameters of the work. Thus the hand wheel becomes an adjusting mechanism for adjusting the collet to a work of a particular diameter, while the lever 35 is utilized for the successive clamping and release of the work. It may be noted that regardless of the extent to which hand wheel 27 may be operated to adjust the collet to a range of work diameters, the extent of jaw opening and closing in each operation of clamping and releasing the work, will be the same for all positions of adjustment through hand wheel 27, the degree of opening through operation of lever 35 being determined by the relative shift between tube 24 and hand wheel 27 regardless of the starting position.

The hand wheel 27 may also be utilized in the individual openings and closing of the collet, for obtaining a greater degree of freeing of the jaws from the work, if desired.

In the collet tightening position, lever 35 is arranged for substantially balanced rotation along with the lathe spindle. If it were unbalanced, centrifugal forces would tend to cause it to fly outwardly to the collet relaxing position where rotational speed is high. Dynamic balancing of the lever with reference to the remainder of the rotating assembly is based primarily upon the channel shape of the lever, and involves, in addition, the proportioning of the lever cross section in such a manner that its weight is distributed substantially uniformly about the axis of rotation when the lever is in the tightening position. Fig. 4 illustrates how this may be accomplished. Side portions 45 of the lever channel section may be relatively thick, whereas the central web portion 46 of the channel section may be relatively thin. The thick side portions 45 may be largely distributed on one side of the axis of pivots 40 so as to balance the thinner web portion 46 which is on the other side of the axis. The web portion 46 is of greater circumferential extent but of less thickness. The side portions 45 are of greater thickness but of less circumferential extent. These dimensions are proportioned so as to establish a balance which may be regarded as embodying substantially the distribution of equal centrifugal moments at the centers indicated at 45' for the side portions 45, and at 46' for the web portions 46, at substantially 120° apart (i. e. equidistantly around the center of rotation). Actually, the angle between centers 45' may be slightly greater than 120° and the other two angles slightly less, based upon the centers of mass of side members 45 being slightly farther from the axis of rotation than that of web 46.

The above described balancing feature may be regarded as optional depending upon the type of spindle to which the invention is applied. For example, it can be dispensed within connection with a slow speed spindle, but will ordinarily be used where the spindle operates at high speed.

The movement of lever 35 toward its tightening position is limited, at the fully tightened position, by engagement against the face of hand wheel 27, of the squared corners of cam fingers 37 which are defined between squared ends 41 and the adjacent sides of fingers 37. At this limit position, lever 35 is in balanced relation to the axis of rotation. The lever is held in this position by frictional engagement of squared ends 41 against the hand wheel, under the relatively high tension loads which are developed in the tightening action. In the relaxed position the lever is of course unbalanced, but there is no occasion for rotating the spindle at this time and the condition is therefore immaterial.

The diagonal faces 42 support the lever in the inclined position shown in Fig. 6, in which it is sufficiently spaced away from hand wheel 27 so that it may be readily grasped. Movement of the lever beyond this relaxed position, nearer to the hand wheel, is prevented by the engagement of the obtuse angle corners defined between diagonal faces 42 and the adjacent longitudinal margins of fingers 37.

Regardless of whether the handwheel 27 is used merely for adjusting the collet to different work diameters or for rough closing of the collet and followed by a tightening action through lever 35 for each cycle of clamping and unclamping the work, the invention obviates the necessity for using the hand wheel 27 to tighten the collet jaws against the work. Where a hand wheel is utilized for this purpose, the lathe spindle must be locked against rotation before the rotation of the handwheel can become effective to tighten the collet. The present invention eliminates the necessity for thus locking the spindle against rotation during the tightening operation, since it does not depend upon relative rotation between the hand wheel and the spindle.

The invention also provides a faster tightening operation than can be obtained in the conventional hand wheel operation. Thus the production of a lathe may be speeded up.

The invention further provides a pre-determined degree of tightening for each tightening operation, the degree of tightening being pre-set by the adjustment of the hand wheel 27, for any particular work diameter. It obviates any necessity for determination by the operator of a proper degree of tightening for each cycle of clamping and unclamping. This further speeds up the operation of the machine.

The invention involves, as a further improvement, a work-positioning means the accuracy of which is not impaired by variations in the amount of collet closing movement which may be required for clamping the collet on succeeding work pieces. In conventional collet mechanisms, it is common to utilize a work positioning stop which is fixed within the collet closing tube. Such a stop will of course shift axially with the tube in the collet closing and opening movement. This is not objectionable so long as the succeeding work pieces are of uniform diameter and the collet accordingly moves the same distance each time that it is closed upon a work piece. But where irregularities in diameters of the work pieces exists, the collet will move farther in order to clamp upon a smaller work piece than to clamp upon a larger work piece. This will result in a variation in the axial positioning of the projecting portion of the work piece with reference to the tool which is to operate thereon, and will result in corresponding variations in the finished parts.

The present invention provides an arrangement wherein the work positioning stop 18 is in the form of a relatively long shaft, secured in fixed relation to the spindle 10 rather than to the collet closing tube. This is accomplished by utilizing the set screws 29 to execute the secondary function of clamping against the cylindrical wall of stop 18 so as to secure the same to hub 28 which in turn has a relation to spindle 10 which is axially fixed by the engagement of the end of the hub against the spindle. So long as the hub is maintained in engagement with the spindle, the position of stop 18 will thus be accurately related to the spindle and independent of the movements of collet closer tube 24. Thus the work will always project the same amount beyond the spindle head 19.

Stop 18 may be provided with a reduced forward end portion 48 which can enter the collet 22 as far as jaws 21, for positioning relatively short work pieces. The rear end portion of stop 18 is received in the recess of handle 36, as indicated by the phantom showing of said rear portion, which is broken away to avoid obscuring the illustration of other parts.

I claim:

1. A collet closing mechanism for a machine tool apparatus including a rotatably mounted tubular spindle having a head provided with a collet closer throat, and a collet having a driving connection with, and axially slidable in said head for closing coaction with said throat, said collet closing mechanism comprising: a tube axially slidable and rotatable within said spindle and having a threaded connection with said collet at its forward end, for adjusting said collet axially when said tube is rotated relative to said spindle, the rear end of said tube projecting beyond the rear end of said spindle; a hand wheel mounted on said projecting rear end of the tube and having an axially shiftable driving connection therewith, said hand wheel having means providing end bearing engagement with the rear end of the spindle to provide a fulcrum through which collet tightening tension loads may be applied to said tube, rotation of said hand wheel in one direction causing the collet to be drawn into the tube and against said throat; and a tightening device comprising a lever pivotally connected to said projecting rear end of the tube and having a cam finger engageable with the hand wheel when the lever is tilted, to effect axial shifting of the tube rearwardly in the hand wheel, for tightening the collet jaws upon the work.

2. A collet closing mechanism for a machine tool apparatus including a rotatably mounted tubular spindle having a head provided with a collet closer throat, and a collet having a driving connection with, and axially slidable in said head for closing coaction with said throat, said collet closing mechanism comprising: a tube axially slidable and rotatable within said spindle and having a threaded connection with said collet at its forward end, for adjusting said collet axially when said tube is rotated relative to said spindle, the rear end of said tube projecting beyond the rear end of said spindle; a hand wheel mounted on said projecting rear end of the tube and having an axially shiftable driving connection therewith, said hand wheel having means providing end bearing engagement with the rear end of the spindle to provide a fulcrum through which collet tightening tension loads may be applied to said tube, rotation of said hand wheel in one direction causing the collet to be drawn into the tube and against said throat; and a tightening device comprising a lever pivotally connected to said projecting rear end of the tube and having a pair of spaced cam fingers engageable with the hand wheel when the lever is tilted, to effect axial shifting of the tube rearwardly in the hand wheel, for tightening the collet jaws upon the work.

3. A collet closing mechanism for a machine tool apparatus including a rotatably mounted tubular spindle having a head provided with a collet closer throat, and a collet having a driving connection with, and axially slidable in said head for closing coaction with said throat, said collet closing mechanism comprising: a tube axially slidable and rotatable within said spindle and having a threaded connection with said collet at its forward end, for adjusting said collet axially when said tube is rotated relative to said spindle, the rear end of said tube projecting beyond the rear end of said spindle; a hand wheel mounted on said projecting rear end of the tube and having an axially shiftable driving connection therewith, said hand wheel having means providing end bearing engagement with the rear end of the spindle to provide a fulcrum through which collet tightening tension loads may be applied to said tube, rotation of said hand wheel in one direction causing the collet to be drawn into the tube and against said throat; and a tightening device comprising a lever including a handle and a pair of laterally spaced cam fingers embracing and pivotally connected to the projecting end of said tube for tilting movements on an axis disposed as a diameter thereof between positions aligned with and transverse to the tube axis respectively, said cam fingers having end faces engageable with the rear face of said hand wheel when the lever is in the aligned position, for determining collet tightening position of the tube relative to the hand wheel, and having lateral faces engageable with said rear face of the hand wheel when the lever is tilted to the transverse position, from the tube axis, for determining collet relaxing position of the tube with reference to the hand wheel.

4. A collet closing mechanism as defined in claim 3, wherein said cam fingers have arcuate cam faces connecting said end faces to said lateral faces thereof and arranged spirally with reference to said axis of tilting, whereby to exert a camming action against the hand wheel for drawing the tube rearwardly therein when the lever is moved from said transverse position to said aligned position.

5. A collet closing mechanism as defined in claim 4, wherein, said end faces, remote from said arcuate cam faces, are squared with reference to the adjacent side margins of the lever, whereby to limit the collet closing movement of the lever so that the lever cannot be moved past said aligned position.

6. A collet closing mechanism as defined in claim 5, wherein said lateral faces of the cam fingers are disposed diagonally with reference to the longitudinal axis of the lever and are flatted to limit the collet opening movement of the lever to a position projecting diagonally away from said rear face of the hand wheel, so as to facilitate grasping the lever.

7. A collet closing mechanism for a machine tool apparatus including a rotatably mounted tubular spindle having a head provided with a collet closer throat, and a collet having a driving connection and axially slidable in said head for closing coaction with said throat, said collet closing mechanism comprising: a tube axially slidable and rotatable within said spindle and having a threaded connection with said collet at its forward end, for adjusting said collet axially when said tube is rotated relative to said spindle, the rear end of said tube projecting beyond the rear end of said spindle; a hand wheel mounted on said projecting rear end of the tube and having an axially shiftable driving connection therewith, said hand wheel having means providing end bearing engagement with the rear end of the spindle to provide a fulcrum through which collet tightening tension loads may be applied to said tube, rotation of said hand wheel in one direction causing the collet to be drawn into the tube and against said throat; and a tightening device comprising a lever of channel section having a bifurcated end providing a pair of diametrically opposite cam fingers embracing and pivotally connected to respective sides of said projecting end of the tube on an axis disposed as a diameter thereof, between positions aligned with and transverse to the tube axis respectively, said cam fingers having end faces for engagement against the rear face of the hand wheel when the lever is in said aligned position, to determine a collet tightening position of the tube in the hand wheel, and having lateral faces to engage the hand wheel when the lever is in said transverse position, for determining a collet relaxing position of the tube relative to the hand wheel, and a work stop mounted within said tube adapted to project from the rear end thereof and be accommodated within the channel of said lever.

8. A collet closing mechanism as defined in claim 7, wherein the channel section of said lever includes relatively thick side portions and a relatively thin central web portion, related to one another for substantially equal distribution of the weight thereof around the rotational axis of said tube when the lever is in said aligned position.

9. A collet closing mechanism for a machine tool apparatus including a rotatably mounted tubular spindle having a head provided with a collet closer throat, and a collet having a driving connection with, and axially slidable in said head for closing coaction with said throat, said collet closing mechanism comprising: a tube axially slidable and rotatable within said spindle and connected to said collet at its forward end, for adjusting said collet axially; means coacting between the rear end of said tube and said spindle for effecting axial shift of the tube within the spindle for closing the collet, said means including a fulcrum part bearing against the rear end of said spindle when the collet is closed; and a work positioning stop comprising a shaft disposed within said tube, and means fixedly associated with said fulcrum part, extending through the wall of said tube and engaging said stop to fix the position thereof relative to said spindle independently of movement of said tube within the spindle, said tube having apertures through which said stop fixing means project with freedom for shift of the tube relative thereto.

10. A collet closing mechanism for a machine tool apparatus including a rotatably mounted tubular spindle having a head provided with a collet closer throat, and a collet having a driving connection with, and axially slidable in said head for closing coaction with said throat, said collet closing mechanism comprising: a tube axially slidable and rotatable within said spindle and having a threaded connection with said collet at its forward end, for adjusting said collet axially when said tube is rotated relative to said spindle, the rear end of said tube projecting beyond the rear end of said spindle; a hand wheel mounted on said projecting rear end of the tube and having an axially shiftable driving connection therewith, said hand wheel having means providing end bearing engagement with the rear end of the spindle to provide a fulcrum through which collet tightening tension loads may be applied to said tube, rotation of said hand wheel in one direction causing the collet to be drawn into the tube and against said throat; said axially shiftable driving connection comprising key elements fixed to said hand wheel and projecting radially inwardly, said tube having apertures through which said key elements project with clearance for axial shift of the tube relative thereto, and a work positioning stop comprising a shaft mounted within said tube and having a fixed connection with said hand wheel through said drive elements.

11. A collet closing mechanism for a machine tool apparatus including a rotatably mounted tubular spindle having a head provided with a collet closer throat, and a collet having a driving connection with, and axially slidable in said head for closing coaction with said throat, said collet closing mechanism comprising: a tube axially slidable and rotatable within said spindle and having a threaded connection with said collet at its forward end, for adjusting said collet axially when said tube is rotated relative to said spindle, the rear end of said tube projecting beyond the rear end of said spindle; a hand wheel having a hub slidably receiving the rear end portion of the tube; a plurality of keys fixed in said hub and projecting radially inwardly, said tube having apertures through which said keys project with clearance for axial shift of the tube relative thereto, and a work positioning stop comprising a shaft mounted within said tube and secured by said keys in fixed relation to said hub.

12. A collet closing mechanism as defined in claim 11, wherein said keys are in the form of set screws threaded into the wall of said hub and having stems projecting through said shaft apertures and clamped against the cylindrical wall of said shaft.

References Cited in the file of this patent

UNITED STATES PATENTS

| | | |
|---|---|---|
| 1,272,109 | Robbins | July 9, 1918 |
| 2,263,117 | Blanchard et al. | Nov. 18, 1941 |
| 2,363,721 | Evans | Nov. 28, 1944 |
| 2,396,760 | Thomas, 3rd | Mar. 19, 1946 |
| 2,635,495 | Thompson | Apr. 21, 1953 |